Sept. 8, 1931. 1,822,863
E. J. LEVY, NOW BY JUDICIAL CHANGE OF NAME E. L. MAYO
THERMOSTATIC VALVE
Filed Aug. 26, 1929

Inventor
Edward J. Levy
By Slough and Canfield
Attorneys

Patented Sept. 8, 1931

1,822,863

UNITED STATES PATENT OFFICE

EDWARD J. LEVY (NOW BY JUDICIAL CHANGE OF NAME EDWARD LEVY MAYO), OF CLEVELAND, OHIO, ASSIGNOR TO THE BISHOP & BABCOCK MFG. CO., OF CLEVELAND, OHIO, A CORPORATION OF OHIO

THERMOSTATIC VALVE

Application filed August 26, 1929. Serial No. 388,309.

This invention relates to thermostatically operated devices for controlling the flow of fluids and more particularly relates to thermo-responsive valve devices for opening and closing fluid passages to regulate the flow of fluid therethrough.

An object of my invention is to provide an improved thermostatically controlled valve mechanism adapted to be operated in a fluid circulatory system, wherein relatively high fluid pressures are exerted in a highly efficient manner to control the flow substantially commensurably with the temperature.

Another object of my invention is to provide a mechanism of the above type adapted to be installed in the water cooling system of an automotive engine which is capable of withstanding high pump pressures without necessitating the use of large valves and ports with resultant excessive heating of the motor.

Another object of my invention is to provide a mechanism of the above type wherein the operation of the valve from the closed to fully opened position is accomplished by a very small movement of the thermostatic element of the mechanism to secure accurate throttling and higher average running temperatures, at the same time affording a free passageway to flow of cooling fluid when the passageway is fully opened by the valve, to secure fullest reduction of temperature upon the valve attaining such fully opened position.

Another object of my invention is to provide an improved unitary thermostatically operable valve mechanism for automotive engine circulatory cooling systems, interchangeably installed on motor blocks having fluid passage openings of various sizes through which the thermostat of the mechanism is to be projected.

Another object of my invention is to provide an improved thermostatically operable mechanism employing an expansible bellows type of thermostat of very small size, wherein the movements required of the movable portions of the bellows are very small to insure that the bellows may be operated efficiently over a long period of time.

Another object is to provide a thermo-responsive valve device of the class described, which will be cheap to construct and simple to assemble and efficient and durable in operation.

Another object is to provide a thermo-responsive valve device adapted for installation in the line of water flow from an internal combustion engine to the radiator therefor in a simple and easily accessible manner.

Other objects will be apparent to those skilled in this art.

My invention is fully disclosed in the following description taken in connection with the accompanying drawings in which,—

Figure 1:
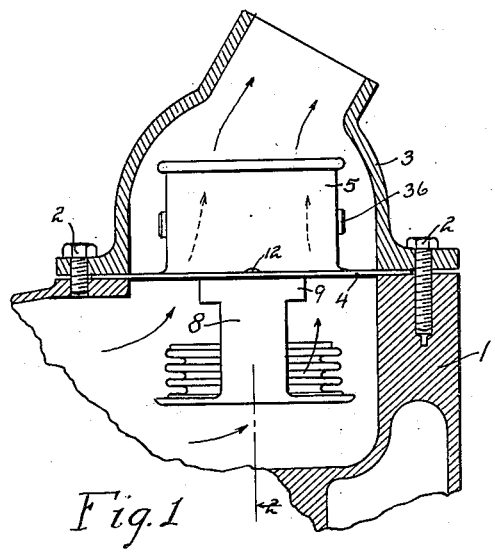
Fig. 1 is a front elevational view of my improved valve device as it appears installed on the head of an internal combustion engine.

In Fig. 1 at 1 is represented a part of the water jacket on the head of an internal combustion engine. Mounted upon the head and secured thereto by screws 2—2 is a hose connection head 3 on which a water hose connected to the engine radiator may be secured in a well known manner. Water may be caused to circulate through the engine head outwardly and into the hose connection head as indicated by the arrows.

By means of an annular flange 4 forming a part of the frame of the valve device, the device as a whole is clamped and sealed on the engine between the engine head 1 and the hose connection head 3 by drawing up the screws 2. The working parts of the valve device are carried in a frame of which one element is the planular annular flange 4 referred to. Formed integrally with the flange is a vertical cylindrical tubular valve seat portion 5, the upper end of which may be turned or spun over to give finish and strength thereto if desired as at 6. Suspended from the flange 4 is a generally U-shaped frame 7 comprising vertical hangers 8—8 terminating at their upper ends in enlarged heads 9, the upper terminations of which are provided with reduced tongues 10, adapted to be inserted in apertures 11 in the flange 4 and riveted over as at 12 to secure the supporting frame 7 to the flange. The lower ends of the hangers 8 are joined by an integrally formed generally circular horizontally disposed pan 13.

The pan is formed to have an annular recess, concave upwardly as at 14, and the recess forms the seat for a thermostatic element shown generally at 45, it comprising a bellows 15 preferably of metal and of known or suitable form. The lower end of the bellows may be sealed in the recess by an annular filler of solder or the like 16 joining the bellows 15 and the pan 13. The upper end of the bellows is joined by a similar filler of solder 17 to a bellows head 18 preferably formed from sheet metal and provided with an annular downwardly convex bead 19 to contribute strength and stiffness thereto and to provide a recess for solder for a purpose to be described. The head 18 has a central perforation 20, in which a lower valve stem 21 is secured and sealed in the following manner. The lower stem 21 is preferably turned down from a cylindrical bar leaving a collar 22 and providing a reduced neck 23 which is inserted in the aperture 20 and then riveted or spun over as at 24 to grip the edge of the aperture 20 between the collar and the riveted portion. To seal the joint thus made, solder as at 25 may be applied in the annular recess between the bead 19 and the riveted portion 24.

The stem 21 is also turned down above the collar 22 and threaded as at 26 to receive the turnbuckle 27. The axis of the stem 21 is bored out as at 28 to provide a passage way by which the interior of the bellows may be exhausted to produce a vacuum therein and by which a heat expansible gas or fluid may be admitted to the bellows for a well known purpose; and the passage way may be sealed by a plug 29 and solder 30. It will be understood that by this construction the space enclosed by the bellows 15, pan 13, head 18 and lower stem 21 is hermetically sealed.

The turnbuckle 27 referred to is preferably of hexagon form (not shown) to receive a wrench for a purpose to be described and is internally bored and threaded to mate with the threads 26 at its lower end and on its upper end is internally bored and threaded as at 31 to receive an upper valve stem 32. The threads 31 are left hand with respect to the threads 26 so that when the turnbuckle 27 is turned about its axis, it will adjustably draw the valve stem 32 downwardly or propel it upwardly as will be understood, and for a purpose to be described. When this adjustment has been properly determined in the assembly of the device, it may be made permanent in any suitable manner as for example by spotting with solder as at 33.

Figure 4:
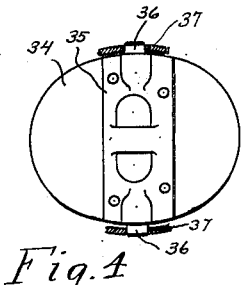
Fig. 4 is a view of a valve element which I may employ and which is shown in Fig. 2, but drawn therein to a larger scale.
Figure 5:
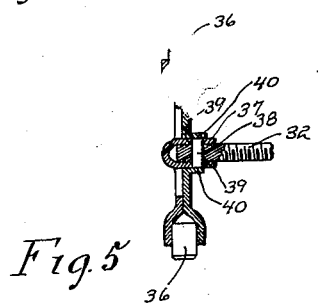
Fig. 5 is a sectional view taken approximately from the plane 5 of Fig. 2.

The valve proper 34 consists of an elliptical disk shown separately in Fig. 4. Upon the upper side of the disk is riveted or spot welded a transverse member 35. In the ends of the transverse member and in the adjacent edges of the valve 34 pockets are pressed into which valve pivot trunnions 36 are secured. The trunnions extend through apertures 37 in the wall of the tubular valve seat 5 and the ellipse shaped valve 34 is thus mounted to oscillate on an axis parallel to its minor ellipse axis but spaced therefrom a small amount as will appear later.

The transverse member 35 is formed with bearing lugs 37 depending therefrom and passing through a suitable aperture approximately at the center of the valve 34, to provide a bearing support for a bearing pin 38 supported in perforations 39 in the lugs 37. Tongues 40 formed from and depending from the valve 34 lie adjacent to the lugs 37 and cover the perforations 39, thus, in a simple manner trapping the pin 38 in the perforations 39. The upper end of the valve stem 32 lies between the lugs 37 and has a bearing on the pin 38.

The valve stem 32, the turnbuckle construction and associated parts above described are disposed longitudinally along the axis $x$ of the tubular valve seat 5, and in the operation of the device to be described, the valve stem 32 may move longitudinally along the axis and communicate its movement to the valve 34 causing it to oscillate around the axis $y$ of the trunnions 36. The valve 34 and its associated parts above described are so constructed that the axis $y$ lies at one side, the right side, as viewed in Fig. 2 of the axis $x$; and the axis $z$ of the pin 38 may lie at the left of the axis $x$ or may in the preferred construction intersect the axis $x$ in one or more of the positions of the axis $z$ as it moves on an arc around the axis $y$ in going from the closed position, Fig. 2, to the full open position, Fig. 3. The elliptical periphery of the valve 34 when in the closed position, Fig. 2, comes into valve closing contact with the inner wall of the tubular valve seat 5. By means of its tubular form, the valve seat element 5 may also function as a passage way through which fluid to be controlled may flow. In a manner to be referred to later, the thermostatic element 45, at relatively low temperatures, may be caused to pull downwardly on the valve stem 32 and oscillate the valve 34 into pressure contact with the valve seat 5 and the pressure thereof may be adjusted as desired by turning the turnbuckle 27 to draw downwardly or propel upwardly the valve stem 32.

Figure 2:
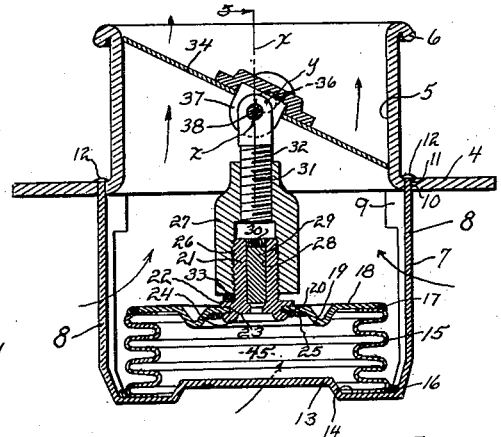
Fig. 2 is a cross-sectional view drawn to a larger scale and taken approximately from the plane 2—2 of Fig. 1, and with the engine parts omitted.
Figure 3:
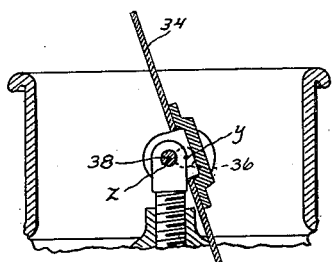
Fig. 3 is a fragmentary view similar to Fig. 2 but with some of the parts in different positions.

The thermostatic element 45 is shown in Fig. 2 with its parts in the positions which they assume at relatively low temperatures. The thermostatic element 45 has the well known characteristic of bellows thermostats contracting along its central axis on a reduction of temperature and expanding along the axis on a rise of temperature. For this purpose, the bellows may be assembled with any suitable degree of vacuum therein and containing any suitable heat expansible material such as liquid or gas. Under the conditions described for it in connection with Fig. 2, the vacuum therein exerts a downward pull on the head 18 and hence on the stem 32. Upon a rise of temperature the vacuum decreases and the downward pull decreases correspondingly.

One of the preferred applications of my invention is in the control of the water circulating system of an internal combustion engine. When applied to this use, the water is circulated under pressure by means of the usual pump, not shown, and flows through the valve device when the valve is in the open position and thence to the automobile radiator and is cooled therein; and when the valve closes the flow through the radiator is discontinued. The direction of the flow is indicated in Figs. 1 and 2 by the arrows. The water thus exerts pressure on the valve 34, which is maximum when the valve is closed and which diminishes when the valve opens, because in its open positions the valve lies in the direction of flow and because the pressure itself becomes less when the water flows freely.

By positioning the axis of the trunnions 36 at one side of the tubular axis as described above, the area of the valve at the left of the valve axis (as viewed in Fig. 2) and therefore exposed to the water pressure set up by the pump is greater than the area at the right of the valve axis, so that the water pressure tends to move the valve to open it or if open to open it farther, this opening pressure opposes the downward force of the thermostatic element which tends to hold the valve closed or to close it.

In the operation of my valve device, it will now be apparent that when the temperature of the fluid, for example the cooling water in an internal combustion engine, is below a pre-determined value, the thermostatic element 45 will hold the valve 34 closed. The forces acting on the valve will be the water pressure tending to open it and the opposing force of the thermostatic element tending to close it, the latter force being adjustable by the turnbuckle 27. At any adjustment of the turnbuckle 27, the downward pull of the thermostatic element 45 is, as will be understood, due to the degree of vacuum inside the bellows 15. Expressed in other words, the pressure of the water on the head 18 of the thermostatic device tends to collapse the bellows 15, and the pressure of the vapor or gas contents of the bellows opposes the said water pressure; the internal pressure may be reduced to a suitable amount so that at relatively low temperatures and at higher temperatures up to a pre-determined valve regulating temperature, the said water pressure outside the bellows 15, will be greater than the internal pressure and give a resultant downward pull on the valve stem 32. It is understood of course, that on a rise of temperature the contents of the bellows 15 will expand to increase the internal pressure.

Starting with the temperature of the water at a relatively low value, upon operating the engine, the temperature of the water will rise, and will reach a value at which the downward pull of the thermostatic element will have diminished to such a point that the resultant pressure of the water on the valve tending to open it will equal and counterbalance said pull. This is the pre-determined temperature at which regulation of the device begins. Upon further rise of temperature, the downward pull of the thermostatic device will continue to decrease and the water pressure directly on the valve will open it and as the downward pull of the thermostatic element decreases more and more upon further rise of temperature the water pressure will open the valve more and more.

The expansion of the fluid contents of the bellows expands the bellows to assist the water pressure in the valve opening movement.

The farther the valve opens the less will be the opening force thereon due to the water pressure because the valve takes up a position more and more in the direction of flow and because, due to the open valve, the pressure in the system diminishes. Concurrently, the downward force exerted by the thermostatic element diminishes, is discontinued, and is subsequently reversed upon increased temperatures to supplement the water pressure in its valve opening effort. Thus, the valve opening force of the water pressure and the valve closing force of the thermostatic element tend at all positions to be balanced.

When the valve opens as described, it permits the water to flow to the radiator and to be cooled, thus stopping the rise of temperature. If the radiator lowers the water temperature, the force of the thermostatic element will increase and the valve will partially close, thus reducing the rate of flow of water to the radiator and reducing the cooling effect thereby.

Thus, the position of the valve 34 is regulated and the flow of water to the radiator is controlled thereby responsive both to the temperature and pressure of the water to maintain a substantially constant water temperature at a pre-determined high temperature value. This value may be chosen as the efficient operating temperature of the engine.

Also, when the engine is cold the valve will remain closed, permitting the engine to heat up quickly to its efficient operating temperature. After operating, if the engine is stopped, thus discontinuing the pressure in the water system, the valve will be under the control only of the thermostatic element and therefore will close while the temperature is still high, thus shutting off thermal siphon flow of the water and thus retaining its heat to keep the engine warm.

If at any time and due to any cause, the bellows of the thermostatic device becomes punctured or broken so that the vacuum therein is destroyed, the water pressure will be sufficient at once to open the valve and thus the failure of the device as a regulating device will not prevent the circulating system from functioning in the usual or unregulated manner.

It will be understood of course that the force tending to open the valve due to water pressure thereon may be varied as desired in the construction of the valve device by varying the area of the valve 34 and by varying the amount of off-set of the axis $y$ above referred to; and that the downward force exerted by the thermostatic device as a whole may be varied by varying the area of the head 18. Inasmuch as my invention is not limited to the exact temperatures at which it regulates, these proportions and quantities have not been described in detail and may be varied over a wide range to adapt the device to various installations.

One of the advantages of my improved valve device is that the bellows 15, since it requires only a few convolutions, may be relatively cheap and thus the cost of the device as a whole may be kept to the minimum. When only a few convolutions are employed only a small longitudinal movement can be attained and this is compensated for by employing the pivot connection to the valve, and by positioning the axes, $y$ and $z$, close together and off-set laterally from each other, as described above. Thus, a cheap bellows type thermo-responsive valve is employed with which a great movement of the valve from closed to open position may be attained, with a minimum movement of the bellows, which will therefore have a long, useful life.

Many and extensive changes and variations may be made in my invention without departing from the spirit thereof.

I claim:

1. In a valve device for controlling the flow of fluid in a conduit and responsive to pressure and temperature conditions of the fluid, a tubular valve seat element through which the fluid may flow, a supporting flange on the tubular element adapted to be sealedly mounted in the joint between two mating elements of the fluid conduit, a valve element mounted to oscillate on an axis transversely of the tubular element to open and close the passageway therethrough, a hanger supported by the flange, a bellows type thermostatic element supported on the hanger, a head on the bellows, a connecting element between the movable valve element and the head, the thermostatic element being adapted to have communicated thereto the pressure and temperature of the fluid to be controlled, the axis of said valve element being positioned at one side of the tube axis whereby the water pressure may tend to move the valve from closed to open position, and the connecting element having pivotal connection with the valve on an axis spaced from the valve axis and adjacent the said tubular axis.

2. In a valve device for controlling the flow of fluid in a conduit, a main frame, a stationary valve element mounted in the frame and having a tubular passage way through which the fluid may flow, a movable valve element mounted for operation on an axis to open and close the passage way, a longitudinally collapsible thermostatic element mounted in the frame, and comprising a collapsible chamber and a head therefor, the chamber being exhausted to a predetermined degree of vacuum and containing a heat expansible medium, the chamber being adapted to have impressed thereupon the temperature of the fluid and the head being adapted to have impressed thereupon the pressure of the fluid, a connecting element between the head and the valve element and having a pivotal connection with the valve element, the said passage way being formed to have a longitudinal axis of symmetry and the oscillatory axis of the movable valve element being positioned at one side of said axis of symmetry.

3. In a valve device for controlling the flow of fluid in a conduit, a main frame, a stationary valve element mounted in the frame and having a tubular passage way through which the fluid may flow, a movable valve element mounted for operation on an axis to open and close the passage way, a longitudinally collapsible thermostatic element mounted in the frame, and comprising a collapsible chamber and a head therefor, the chamber being exhausted to a predetermined degree of vacuum and containing a heat expansible medium, the chamber being adapted to have impressed thereupon the temperature of the fluid and the head being adapted to have impressed thereupon the pressure of the fluid, a connecting element between the head and the valve element and having a pivotal connection with the valve element, the said passage way being formed to have a longitudinal axis of symmetry and the oscillatory axis of the movable valve element being positioned at one side of said axis of symmetry, and the axis of the pivotal connection being positioned to approximately intersect the said axis of symmetry.

4. In a valve device for controlling the flow of fluid in a conduit and responsive both to pressure and temperature changes of the fluid, a supporting frame, a stationary valve element having a passage way through which the fluid may flow, a pivoted valve element adapted to move to open and close the passage way, a regulating element responsive to pressure and temperature conditions of the fluid, said regulating element comprising a sealed chamber exhausted to a predetermined degree of vacuum and containing a heat expansible medium, a head adapted to move and thereby change the volume of the chamber, the head having faces, one of which is subjected to the pressure of the fluid to be controlled and the other of which is subjected to the internal pressure of the chamber, the chamber being adapted to have communicated thereto the pressure of the fluid, a connecting element between the valve and said head, the valve having surfaces disposed on either side of its pivots, of such area and so related as to tend to move the valve toward open position by the fluid pressure and the head being adapted to transmit to the valve through the connecting element the fluid pressure on the head to oppose said valve opening movement, during low temperature conditions of the fluid.

5. In a valve device for controlling the flow of fluid in a conduit and responsive to pressure and temperature conditions of the fluid, a tubular valve seat element through which the fluid may flow, a supporting flange on the tubular element adapted to be sealedly mounted in the joint between two mating elements of the fluid conduit, a valve element mounted to oscillate on an axis transversely of the tubular element to open and close the passage way therethrough, a hanger supported by the tubular element, a bellows type thermostatic element supported on the hanger, a head on the bellows, a connecting element between the movable valve element and the head, the thermostatic element being adapted to have communicated thereto the pressure and temperature of the fluid to be controlled, the axis of said valve element being positioned at one side of the tube axis whereby the water pressure may tend to move the valve from closed to open position.

In testimony whereof I hereunto affix my signature this 2nd day of August, 1929.

EDWARD J. LEVY.

DISCLAIMER 1,822,863.—*Edward J. Levy* (now by judicial change of name *Edward Levy Mayo*), Cleveland, Ohio. THERMOSTATIC VALVE. Patent dated September 8, 1931. Disclaimer filed November 13, 1939, by the assignee, *The Bishop & Babcock Mfg. Company.*

Hereby enters this disclaimer to claim 2 of said patent.

[*Official Gazette December 12, 1939.*]